July 4, 1944.  J. E. BLANDING  2,352,682
OIL FUEL FEED DEVICE
Filed Sept. 10, 1942  3 Sheets-Sheet 2

J. E. Blanding
INVENTOR.
BY

July 4, 1944.  J. E. BLANDING  2,352,682
OIL FUEL FEED DEVICE
Filed Sept. 10, 1942  3 Sheets-Sheet 3

J. E. Blanding
INVENTOR.
BY Knowles

Patented July 4, 1944

2,352,682

UNITED STATES PATENT OFFICE 2,352,682

OIL FUEL FEED DEVICE

Joseph Edward Blanding, New London, Conn., assignor of forty-nine per cent to Patrick Bartholomew McNamara, Groton, Conn.

Application September 10, 1942, Serial No. 457,861

3 Claims. (Cl. 123—31)

This invention relates to internal combustion engines, and aims to improve generally the construction embodied in my Patent No. 1,609,686.

The primary object of the invention is to provide means for feeding fuel oil to the engine in a fine film, and to admit air in such a way that the fuel oil will be thoroughly mixed and vaporized, during the intake stroke of the engine piston, insuring perfect combustion, to the end that the fuel charge is entirely burned and consumed within the engine cylinder, during the power stroke of the engine, and to provide a lower compression ratio of fuel charge to ignite and fire the compressed fuel charge in the engine cylinder, during the power stroke of the engine, by heat of compression.

Another object of the invention is to provide a charge forming device wherein the body portion is constructed in sections, so that by adjusting the sections with respect to each other, the control valves of the device may be adjusted.

Still another object of the invention is to provide a charge forming device including a turbulence chamber, so constructed that the mixture of fuel oil and air will insure the turbulence of the mixture within the chamber, the chamber being heated, by the heat of the engine.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings.

Figure 1:
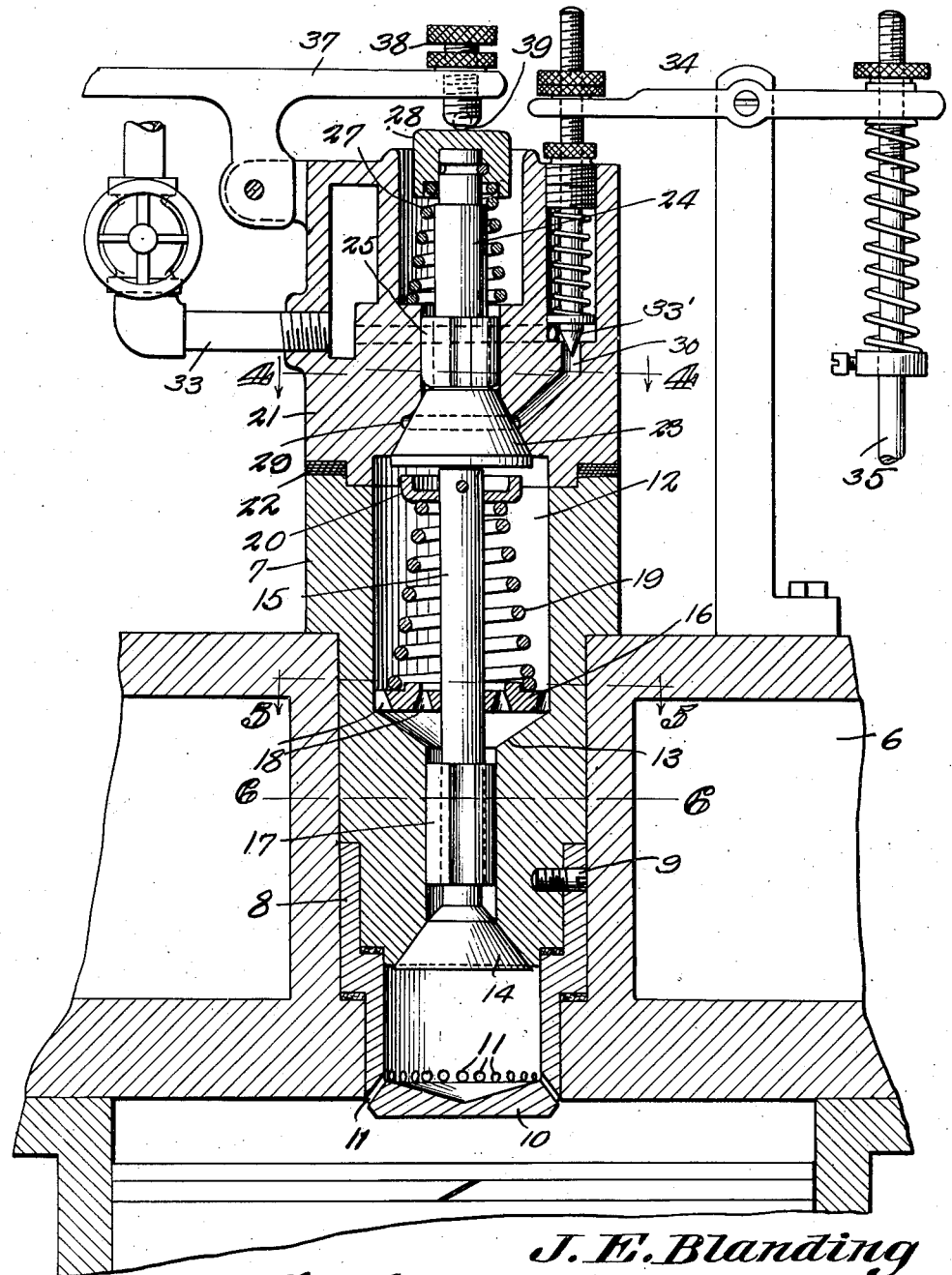
Figure 1 is a vertical sectional view through the upper end of a cylinder and water jacket with the charge forming device, constructed in accordance with the invention, as mounted therein, Figure 1 having been taken on line 1—1 of Figure 2.
Figure 2:
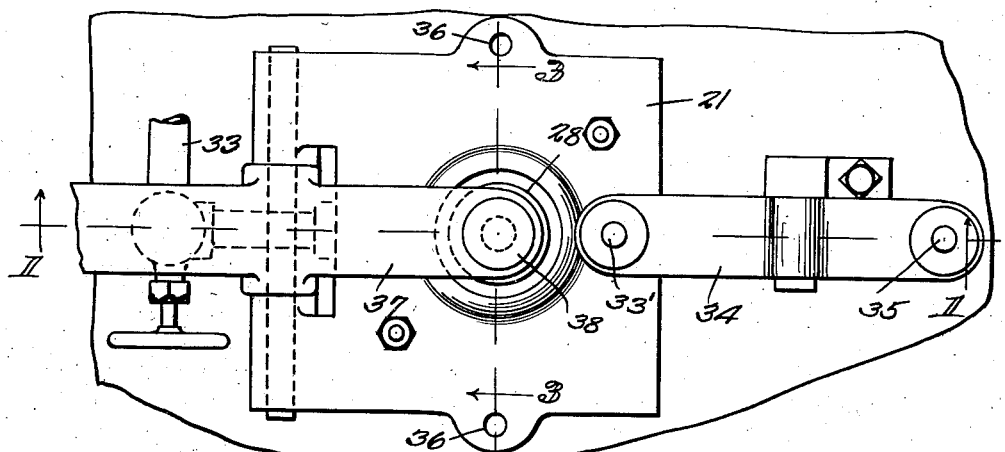
Figure 2 is a plan view of the device.
Figure 3:
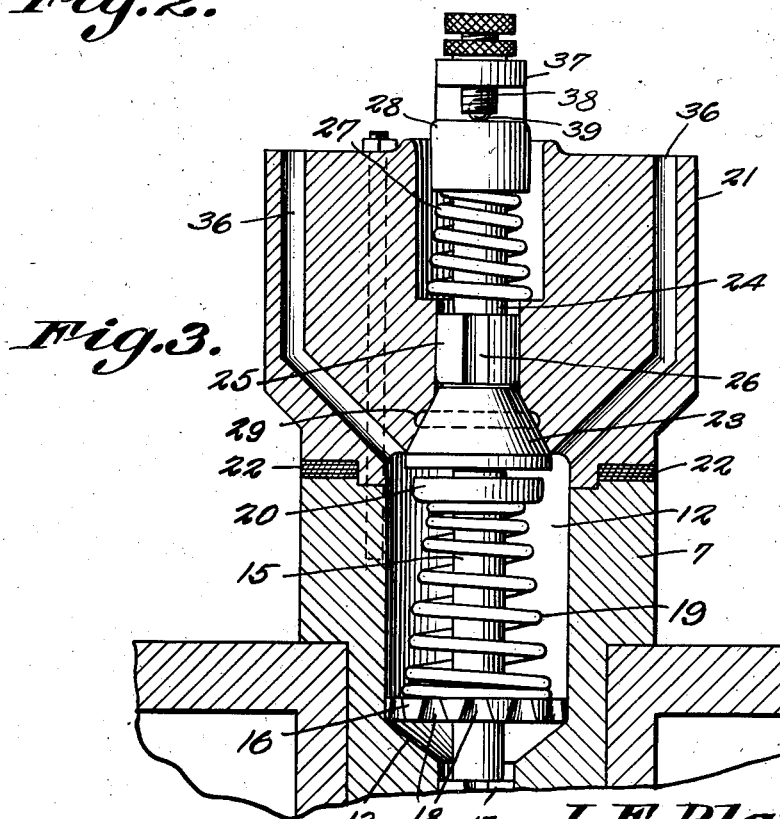
Figure 3 is a vertical sectional view of the charge forming device, taken at right angles to Figure 1.
Figure 4:
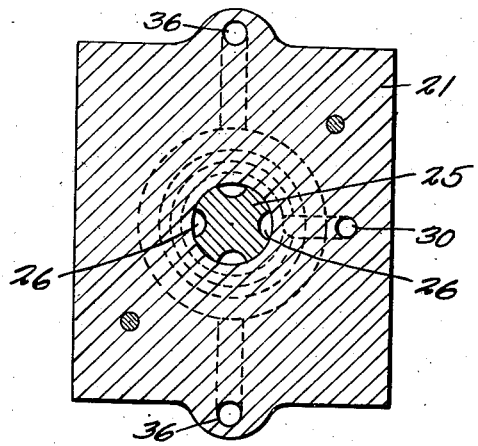
Figure 4 is a sectional view taken on line 4—4 of Figure 1.
Figure 5:
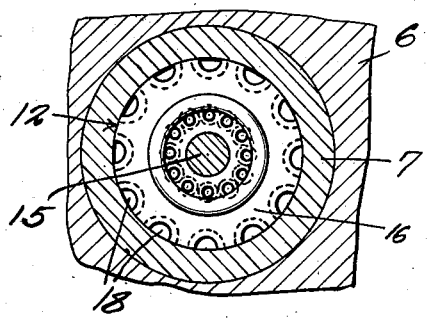
Figure 5 is a sectional view taken on line 5—5 of Figure 1.
Figure 6:
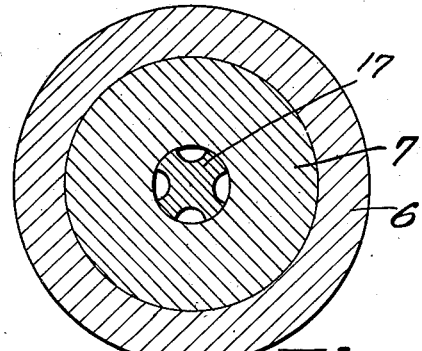
Figure 6 is a sectional view taken on line 6—6 of Figure 1.
Figure 7:
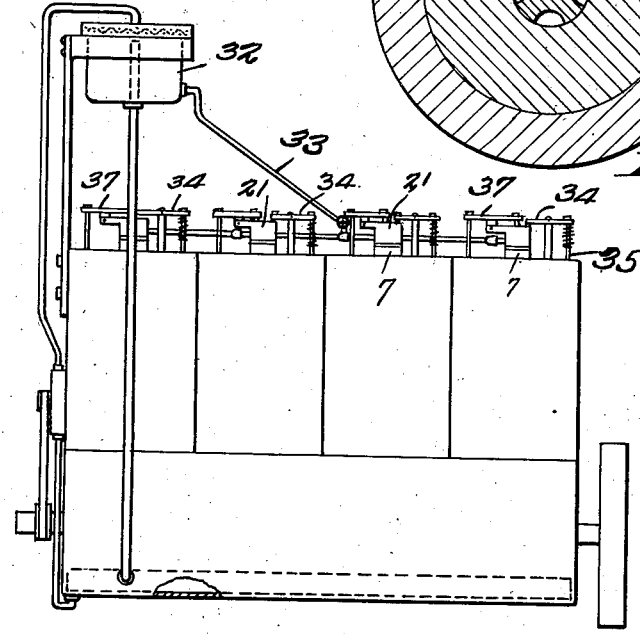
Figure 7 is an elevational view of an engine, illustrating the charge forming device as mounted thereon.

The reference character 5 designates an engine cylinder, and the reference character 6 designates the water jacket thereof.

The water jacket or head of the cylinder is provided with an opening, in which the charge forming device forming the subject matter of the present invention, is mounted.

The charge forming device comprises a main section 7, which is hollow and formed with a reduced end portion which is fitted in the lower section 8, which is also hollow, the sections 7 and 8 being secured together, by means of the screw 9.

The lower section 8 constitutes the turbulence chamber of the device, and as shown, has its lower end closed by the wall 10, the upper surface of which is concaved, as clearly shown by Figure 1 of the drawings.

A series of openings 11 are arranged at oblique angles with respect to the vertical wall of the turbulence chamber, and establish communication between the turbulence chamber and the engine cylinder with which the charge forming device is used.

The main section 7 provides a mixing chamber 12 that has its lower end tapered as at 13 providing a substantially funnel-like bottom. The lower end of the main section 7 is beveled, providing a valve seat for the main control valve indicated at 14. The valve 14 is mounted on the lower end of the valve rod 15, the valve rod 15 being of a length to extend slightly above the upper end of the main section 7.

The reference character 16 designates a supporting disk which is of a diameter to closely fit within the wall of the mixing chamber, and rests on the upper edge of the funnel-shaped bottom 13 of the mixing chamber. The valve rod 15 moves through the central opening in the supporting disk 16, and is provided with an elongated bearing 17 formed with longitudinal openings, whereby the fuel charge may pass from the mixing chamber to the turbulence chamber.

A plurality of openings indicated at 18 are formed in the disk 16, and provide passageways for the mixture to enter the turbulence chamber from the mixing chamber.

These openings 18 are flared outwardly at their lower ends so that as the fuel charge passes from the mixing chamber, the charge may spread when striking the inclined surface or bottom 13, resulting in the charge being broken into fine particles.

The disk 16 also provides a support for the coiled spring 19 which has its upper end bearing against the washer 20, whereupon the coiled spring 19 is held in position at all times.

The reference character 21 designates the upper section of the charge forming device, which is bolted to the main section 7, the section 21 being adjusted with respect to the main section 7, by means of the shims 22.

The lower end of the upper section 21 is beveled, providing a valve seat for the valve 23. The lower end of the valve stem 24 is provided with a bearing 25 movable therewith. The bearing 25 is formed with longitudinal bores 26, through which air passes, and rests on the bottom of the opening formed centrally of the upper section 21 of the charge forming device. Mounted on the upper end of the valve stem 24, is a cap 28 against which the upper end of the valve spring 27 engages. Thus it will be seen that due to this construction, the valve 23 is normally held to its seat, by the action of the coiled spring 27. While the valve 23 normally lies in spaced relation with the upper end of the valve stem 15, the downward movement of the valve 23 operates to move the valve stem 15 downwardly unseating the valve 14, against the action of the coiled spring 19. It will therefore be seen that by removing or adding shims 22, the space between the valve 23 and upper end of valve stem 15 may be regulated, adjusting the throw of the valve 14.

As clearly shown by Figure 1 of the drawings, the valve seat for the valve 23, is formed with an annular groove 29 that communicates with the oil passageway 30 formed in the upper section 21, the oil passageway 30 being supplied with oil, from the chamber which is in communication with the chamber 31 that in turn receives fuel oil, from the tank 32, through the pipe line 33. The passage of fuel oil from the chamber 31, is controlled by the needle valve 33 that is controlled by means of the rocker arm 34 controlled by the action of the push rod 35.

The upper section 21 of the charge forming device, is also provided with bores 36 that extend from the top of the upper section 21, to points adjacent to the periphery of the lower edge of the valve 23, so that air drawn into the mixing chamber, will intercept the oil which is passing downwardly over the cone-shaped valve 23 in a fine film, resulting in a thorough mixing of the oil and air providing a highly combustible mixture.

The valve 33 is operated by the rocker arm 37 which in turn is operated by a cam controlled push rod not shown which forms a part of the usual internal combustion engine.

Mounted on one end of the rocker arm 37, is an adjusting screw 38 which is provided with a sprocket in which the ball 39 is mounted so that an adjustment of the screw 38 may be readily made, to control the flow of the valve 23.

From the foregoing it will be seen that due to the construction shown and described, liquid fuel is drawn into the combustion chamber through the passageway 30, where it is spread over the surface of the valve 23 forming a fine film to be picked up by the air drawn into the mixing chamber, through the air passageways 36 that intercept the film of oil, at a point adjacent to the lower end of the valve 23. A charge resulting from the mixture of oil and air, passes from the mixing chamber, through the openings of the disk 16, and passes into the turbulence chamber which, due to its heated condition, insures a highly combustible charge passing into the engine cylinder.

Having thus described the invention, what is claimed is:

1. A charge forming device adapted to be positioned in an opening of an internal combustion engine, comprising a body portion, said body portion having a mixing chamber formed with a tapered bottom, a disk mounted within the mixing chamber and engaging the wall of the mixing chamber adjacent to the bottom thereof, said disk having a plurality of openings disposed adjacent to its edge and having another circular line of openings adjacent to the center thereof, said openings being outwardly flared at their lower ends, and adapted to direct fuel against the tapered bottom of the mixing chamber, a turbulence chamber at the lower end of the body portion and being in communication with the mixing chamber, to receive a fuel charge therefrom, said turbulence chamber adapted to discharge fuel into an engine cylinder on which the body portion is mounted, and a valve for controlling the passage of fuel into said turbulence chamber.

2. A charge forming device adapted to be positioned in an opening of an internal combustion engine, comprising a body portion, said body portion having a mixing chamber formed with a tapered bottom, a disk mounted within the mixing chamber and adapted to substantially close the bottom of the mixing chamber, said disk having a plurality of openings formed therein, said openings being outwardly flared, at their lower ends, and through which a fuel charge passes to the tapered bottom, a turbulence chamber at the lower end of the body portion, said turbulence chamber being in communication with the mixing chamber to receive a fuel charge therefrom, and a valve for controlling the passage of fuel into said mixing chamber.

3. A charge forming device adapted to be positioned in an opening of an internal combustion engine, comprising a body portion, said body portion having a mixing chamber formed with a tapered bottom, means for directing fuel from the mixing chamber against the tapered bottom, in a plurality of streams, said fuel directing means embodying a disk mounted within the mixing chamber and having a plurality of openings, the walls of said openings being flared outwardly at the lower ends thereof whereby the fuel charge passing therethrough spreads, a turbulence chamber below the mixing chamber and being in communication with the mixing chamber, and a valve for controlling the passage of fuel into said mixing chamber.

JOSEPH EDWARD BLANDING.